United States Patent [19]

Horwitz

[11] 4,250,636
[45] Feb. 17, 1981

[54] YOKE ASSEMBLY FOR FLIGHT SIMULATOR

[75] Inventor: Joshua Horwitz, Magnolia, Mass.

[73] Assignee: Aviation Simulation Technology, Bedford, Mass.

[21] Appl. No.: 44,497

[22] Filed: Jun. 1, 1979

[51] Int. Cl.³ .............................................. G09B 9/08
[52] U.S. Cl. ..................................................... 434/55
[58] Field of Search .................... 35/12 R, 12 K, 12 P, 35/12 S, 10.23, 12 W; 244/83 E; 403/166, 229

[56] References Cited

U.S. PATENT DOCUMENTS

| | | | |
|---|---|---|---|
| 2,519,233 | 8/1950 | Davis et al. | 35/12 W |
| 3,471,627 | 10/1969 | Ziegler | 35/12 W |

*Primary Examiner*—David L. Lacey

*Attorney, Agent, or Firm*—Weingarten, Maxham & Schurgin

[57] ABSTRACT

A yoke assembly for an aviation flight simulator capable of generating the appropriate control signals and mechanical responses for realistic flight simulation, including trim adjustment. In a preferred embodiment, the assembly comprises a rotatable and axially movable yoke shaft extending in an axial direction; a pair of sliding blocks mounted to be movable in the axial direction; a first spring rotationally coupling the yoke shaft with a first sliding block for simulating the rotational restoration force on an aircraft yoke; a second spring axially coupling the yoke shaft to the second sliding block for simulating the axial restoration force on an aircraft yoke; and adjustment means for adjusting the axial position of the second sliding block for simulating the effect of trim adjustment of an aircraft.

8 Claims, 2 Drawing Figures

YOKE ASSEMBLY FOR FLIGHT SIMULATOR

FIELD OF THE INVENTION

This invention relates to a yoke assembly for an aviation flight simulator.

BACKGROUND OF THE INVENTION

Aviation flight simulators are highly useful training tools for developing and improving flying skills. A modern flight simulator can include the full complement of instrumentation and controls used in flying an aircraft. The student's control inputs are converted into appropriate corresponding electrical signals and are fed into aircraft modeling apparatus, such as a programmed microcomputer. The modeling apparatus, in turn, generates appropriate corresponding aircraft response signals to be applied to the various indicating instruments, and the student adjusts his controls accordingly.

The flight characteristics of a wide variety of different flying conditions can be simulated by appropriate programming. A student pilot can use the simulator for practicing different fundamental maneuvers and procedures. An advanced student can practice the same maneuvers with one or more simulated emergencies, and experienced pilots can practice realistic approaches into airports into which they have never before flown.

The yoke assembly is one of the most important controls used in general aviation aircraft. The yoke assembly typically comprises a U-shaped steering yoke, analogous to the steering wheel of a car, attached to one end of an elongated shaft. Using the yoke, the pilot can rotate the shaft in either direction or move it axially inward (toward the nose) or outward.

The yoke shaft is rotationally coupled to the ailerons on the wings and axially coupled to the elevators on the tail. Clockwise rotation of the yoke and shaft lift the left aileron and lower the right so that the aircraft tends to turn in the direction the open "U" points. Similarly, counterclockwise rotation turns the plane in the opposite direction. Pushing the yoke and shaft axially inward lowers the tail elevators, pushing the nose of the aircraft down, and pulling the yoke out raises the elevators, raising the nose.

The yoke assembly is typically coupled to the ailerons and elevators by cable arrangements, and the pilot typically "feels" through the yoke assembly rotational and axial restoration forces very nearly proportional to the displacement of the ailerons and elevators from their respective equilibrium positions. In other words, the wind forces acting on the ailerons tend to rotate the yoke back to its centered position, and wind forces on the elevators tend to push the yoke shaft back to an equilibrium or resting position.

In order to alleviate the axial restoration forces for periods of prolonged climb or descent, aircraft typically includes a trim adjustment mechanism whereby secondary control surfaces on the elevators are used to counterbalance the wind force on the primary control surfaces. By properly adjusting the secondary control surface through a trim "wheel" or knob, the pilot can adjust the equilibrium axial position to correspond to a desired angle of climb or descent.

Prior attempts to simulate the response characteristics of the yoke assembly in a flight simulator have been less than satisfactory. Typical simulated yoke assemblies comprise a yoke, a shaft, a spring and a pair of potentiometers coupled to the shaft by gear trains. Despite the fact that the rotational and axial restoration forces encountered in flight are separate and independent of one another, typical prior art simulators have simulated both restoration forces by the same spring, resulting in cross-coupling. In other words, the force tending to rotationally center the yoke is not only dependent on the amount by which the yoke has been rotated but is also improperly dependent on the amount by which the shaft has been pushed in or pulled out. The consequence of this cross-coupling is that the simulator did not accurately communicate to the student the mechanical response of the yoke.

In addition, typical prior art simulators did not simulate the trim adjustment mechanism and its effect on the yoke assembly restoration force. Thus they failed to provide training in the use of this important control and further deviated from actual flight characteristics.

One further disadvantage of prior art simulators arises from their use of gear train assemblies to couple the shaft and potentiometers. The gear trains tend to produce side loading on the potentiometer shafts, pushing the shafts laterally to the side as well as rotating them. Such side loading contributed to premature failure of the potentiometers.

Another prior art yoke assembly simulator dispenses with gear drive chains by coupling the yoke shaft to the potentiometer shaft through a long pivotally mounted arm. The difficulty with this arrangement, however, is that it takes up a substantial amount of space in the simulator console normally occupied by the horizontal situation indicator in an actual aircraft. Thus, in order to use this coupling arrangement, the situation indicator must either be dispensed with or placed in a new location remote from its actual location in an aircraft.

SUMMARY OF THE INVENTION

In accordance with the invention, a yoke assembly for a flight simulator comprises a rotatable and axially movable yoke shaft extending in an axial direction; a first spring means rotationally coupled to the yoke shaft for simulating the rotational restoration force on an aircraft yoke; a second spring means axially coupled to the yoke shaft for simulating the axial restoration force on an aircraft yoke; and adjustment means for adjusting the axial position of the second spring for simulating the effect of trim adjustment of an aircraft. In a preferred embodiment, sliding block spring mounts are disposed on a pair of axial support shafts axially extending on either side of the yoke shaft, the first sliding block is attached to the end of the yoke shaft, and potentiometers for use in generating simulated control signals are attached to the first block.

BRIEF DESCRIPTION OF THE DRAWINGS

The nature, advantages and various features of the invention will appear more fully upon consideration of the illustrative embodiments now to be described in detail in connection with the accompanying drawings. In the drawings.

DETAILED DESCRIPTION OF THE DRAWINGS

Figure 1:
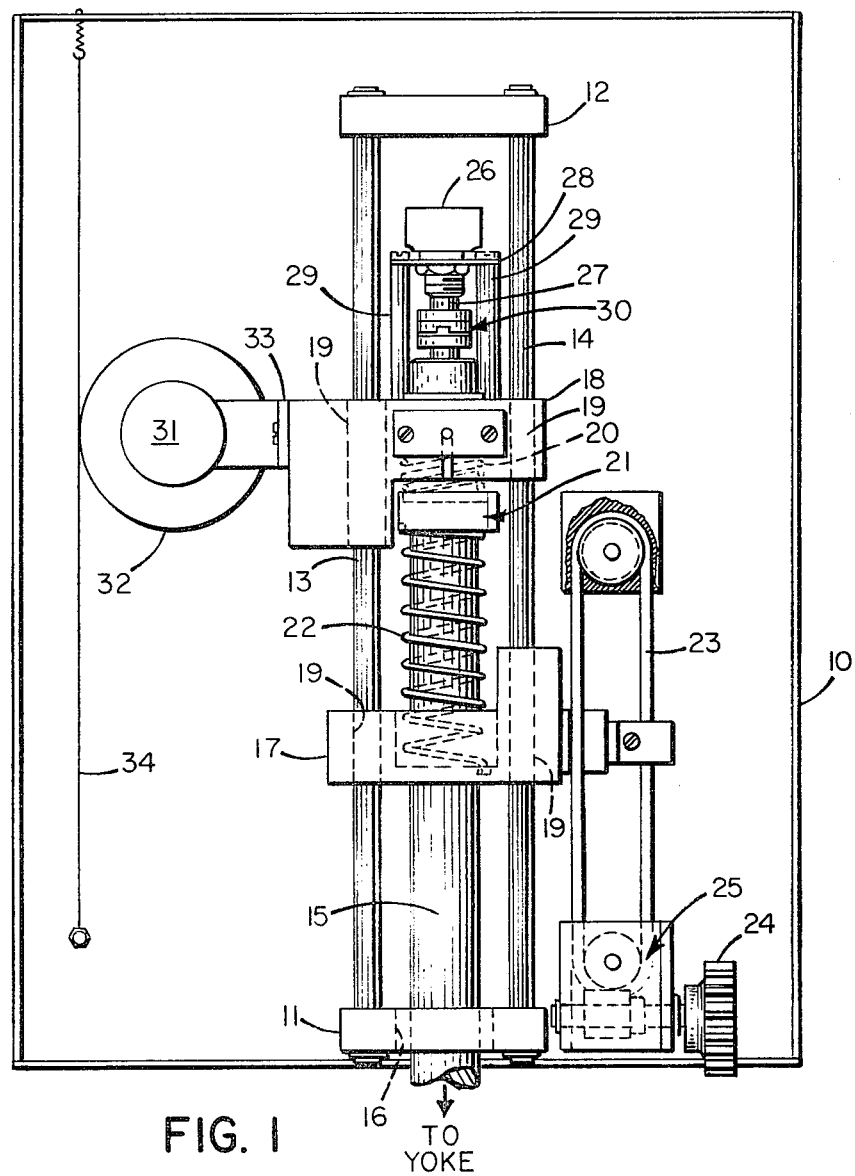
FIGS. 1 and 2 are top and front view, respectively, of a preferred yoke assembly for a flight simulator in accordance with the invention.
Figure 2:
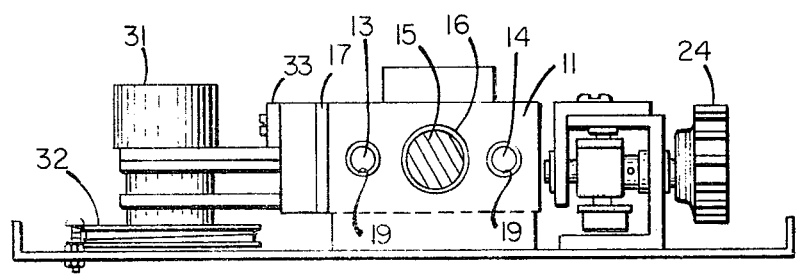

Referring to the drawings, FIGS. 1 and 2 illustrate a preferred yoke assembly in accordance with the invention comprising a base plate 10. A pair of front and back mounting plates 11 and 12, respectively, project from the base plate 10 and rigidly support a pair of guide shafts 13 and 14. A third shaft 15, comprising a yoke shaft of the assembly, passes through an aperture 16 in front mounting plate 11 and extends between guide shafts 13 and 14.

A pair of sliding blocks, a trim block 17 and a slide block 18, are each provided with a pair of apertures 19, through which they are slideably disposed on guide shafts 13 and 14. The apertures 19 are provided with appropriate bearing surfaces such as ball bearings (not shown) to permit axial movement of the blocks along the guide shafts. Because there are two guide shafts, the blocks are constrained against rotation.

The yoke shaft 15 is axially connected to slide block 18 so that axial movement of the yoke shaft produces a corresponding axial movement of the block 18. In addition, the yoke is rotationally coupled to block 18 via torsion spring 20. Specifically, torsion spring 20 is wound around shaft 15 and connected at one end to a collar 21 on the shaft and, at the other end, to slide block 18. This torsion spring provides a rotation restoration force on the yoke shaft tending to resist angular displacement in either direction.

The yoke shaft is coupled to the trim block 17 by a compression spring 22, also connected collar 21 at one end, wound around the shaft and connected to the trim block 17 at the other end. This compression spring provides an axial restoration force on the yoke shaft tending to resist axial displacement either inwardly or outwardly. The position of the trim block thus fixes the axial equilibrium position of the yoke shaft.

The location of the trim block is, in turn, adjusted by a drive chain 23 driven by knob 24 via a worm gear arrangement 25. Thus rotation of knob 24 can be used to adjust the equilibrium position of the yoke shaft to a desired location, thereby effectively "trimming" the axial position of the yoke shaft.

The yoke shaft is rotationally coupled to a first potentiometer 26 for providing a measure of the degree of angular rotation. Specifically, the potentiometer is fastened to slide block 18 with the potentiometer shaft 27 in axial alignment with shaft 15 by a bracket 28 and steel spacers 29. The potentiometer shaft 27 is directly connected to the yoke shaft 15 by shaft coupling 30. Rotation of yoke shaft 15 thus produces a corresponding variation in the resistance of potentiometer 26 which, in turn, can be used to generate an aeliron control input signal to the aircraft modeling circuitry.

The yoke shaft is also axially coupled to a second potentiometer 31 for providing a measure of the degree of axial displacement of the yoke shaft. Specifically, the potentiometer 31 is provided with a large wheel 32 for rotating its shaft and is fixed to slide block 18 by a bracket 33. A spring loaded axially extending dial cord 34 is wound around the wheel 32. Axial displacement of the yoke shaft rotates the wheel and thus the potentiometer shaft, thereby producing a variation in the resistance of the potentiometer proportional to the axial displacement. This variation in resistance can be used to generate an elevator control input signal for the modeling circuitry.

It can thus be seen that in operation this yoke assembly generates the appropriate control signals and mechanical responses for realistic flight simulation, including trim adjustment. Rotational and axial restoration forces are separate and independent, and realistic trim adjustment is provided. Linear potentiometer variations are provided without gear trains or their inherent side loading effects, and all of these control signals and simulated mechanical responses are generated in a very compact assembly.

While the invention has been described in connection with a small number of specific embodiments, it is to be understood that these are merely illustrative of the many other specific embodiments which can also utilize the principles of the invention. Thus, numerous and varied devices can be made by those skilled in the art without departing from the spirit and scope of the present invention.

I claim:

1. In a flight simulator yoke assembly of the type comprising a yoke, an axially moveable rotatable yoke shaft, spring means for providing restoration forces and control signal generation means, the improvement wherein:
   said spring means comprise axially moveable spring means and axially adjustable spring means;
   said yoke shaft is rotationally coupled to said axially moveable spring means to simulate the rotational restoration force on an aircraft yoke and is axially coupled to said axially adjustable spring means to simulate the axial restoration force on an aircraft yoke; and
   adjustment means are provided for adjusting the axial position of said axially adjustable spring means to simulate the effect of trim adjustment of an aircraft.

2. An improved yoke assembly according to claim 1 wherein said control signal generation means comprises a potentiometer having a shaft disposed in axial alignment with said yoke shaft and rotationally coupled to said yoke shaft for generating a simulated control signal corresponding to the rotational movement of said yoke shaft.

3. An improved yoke assembly according to claim 1 wherein said control generation means comprises a potentiometer having a shaft axially coupled to said yoke shaft by means for rotating said potentiometer shaft in proportion to the axial movement of said potentiometer.

4. An improved yoke assembly according to claim 3 wherein said means for rotating said potentiometer shaft is a looped flexible cord.

5. A yoke assembly for an aviation flight simulator comprising:
   a yoke;
   connected to said yoke, a rotatable and axially moveable yoke shaft extending in an axial direction;
   a pair of axially extending support shafts disposed on either side of said yoke shaft;
   first and second sliding block means mounted on said support shafts to be moveable in said axial direction;
   a first spring means rotationally coupling said yoke shaft with said first sliding block means for simulating the rotational restoration force on an aircraft yoke; and
   a second spring means axially coupling said yoke shaft with said second sliding block means for simulating the axial restoration force on an aircraft yoke.

6. A yoke assembly according to claim 5 further comprising adjustment means for adjusting the axial position of the second sliding block means for simulating the effect of trim adjustment of an aircraft.

7. A yoke assembly according to claim 5 further comprising a potentiometer having a shaft rotationally connected to said yoke shaft in axial alignment therewith for generating a simulated control signal corresponding to the rotational movement of said yoke shaft.

8. A yoke assembly according to claim 5 wherein said yoke shaft is axially coupled to a potentiometer having a shaft and said potentiometer is coupled to means for rotating said potentiometer shaft in proportion to the axial movement of said potentiometer.

* * * * *